(12) United States Patent
Shibata

(10) Patent No.: US 10,957,917 B2
(45) Date of Patent: Mar. 23, 2021

(54) MANUFACTURING METHOD OF UNIT CELL OF FUEL CELL

(71) Applicant: TOYOTA JIDOSHA KABUSHIKI KAISHA, Toyota (JP)

(72) Inventor: Kazunori Shibata, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 16/154,298

(22) Filed: Oct. 8, 2018

(65) Prior Publication Data

US 2019/0109336 A1   Apr. 11, 2019

(30) Foreign Application Priority Data

Oct. 11, 2017   (JP) .............. JP2017-198047

(51) Int. Cl.
*H01M 8/0273*   (2016.01)
*H01M 8/0202*   (2016.01)
(Continued)

(52) U.S. Cl.
CPC ....... *H01M 8/0273* (2013.01); *H01M 8/0269* (2013.01); *H01M 8/0276* (2013.01); *H01M 8/0284* (2013.01); *H01M 8/0289* (2013.01); *H01M 8/0297* (2013.01); *H01M 8/10* (2013.01); *H01M 8/241* (2013.01); *H01M 8/0202* (2013.01); *H01M 8/0286* (2013.01); *H01M 8/1004* (2013.01); *H01M 2008/1095* (2013.01)

(58) Field of Classification Search
CPC ............. H01M 8/0273; H01M 8/0276; H01M 8/0284; H01M 8/0297; H01M 8/0269; H01M 8/0289; H01M 8/10; H01M 8/241; H01M 8/0202; H01M 8/0286; H01M 8/1004; H01M 2008/1095
See application file for complete search history.

(56) References Cited

U.S. PATENT DOCUMENTS

2006/0073385 A1*   4/2006   Andrin ................ C08K 5/1515
                                                                429/185
2006/0090330 A1    5/2006   Kauranen et al.
(Continued)

FOREIGN PATENT DOCUMENTS

EP    3 315 280        5/2018
JP    2003-305809     10/2003
(Continued)

OTHER PUBLICATIONS

U.S. Appl. No. 16/154,277, filed Oct. 8, 2018.

*Primary Examiner* — Ula C Ruddock
*Assistant Examiner* — Matthew W Van Oudenaren
(74) *Attorney, Agent, or Firm* — Finnegan, Henderson, Farabow, Garrett & Dunner, LLP

(57) ABSTRACT

A manufacturing method of a unit cell of a fuel cell, includes: preparing a frame member made of resin, first adhesive bonds being provided on one surface of the frame member and being separated from each other and each having thermoplasticity; preparing a separator; and joining the frame member and the separator by heating and pressing the frame member and the separator in a state where the one surface of the frame member faces the separator through the first adhesive bonds, so as to melt the first adhesive bonds to be brought into contact with each other.

9 Claims, 7 Drawing Sheets

(51) Int. Cl.
    *H01M 8/0289*     (2016.01)
    *H01M 8/10*     (2016.01)
    *H01M 8/241*     (2016.01)
    *H01M 8/0276*     (2016.01)
    *H01M 8/0284*     (2016.01)
    *H01M 8/0297*     (2016.01)
    H01M 8/0286     (2016.01)
    H01M 8/1004     (2016.01)
    H01M 8/1018     (2016.01)

(56) References Cited

U.S. PATENT DOCUMENTS

| | | |
|---|---|---|
| 2009/0291344 A1 | 11/2009 | Tanaka et al. |
| 2013/0089809 A1* | 4/2013 | Farrington .......... H01M 8/0297 429/492 |
| 2013/0183604 A1 | 7/2013 | Tanaka et al. |
| 2017/0162882 A1* | 6/2017 | Kawasumi .......... H01M 8/0284 |

FOREIGN PATENT DOCUMENTS

| | | |
|---|---|---|
| JP | 2006-019204 A | 1/2006 |
| JP | 2006-128109 A | 5/2006 |
| JP | 2008-034278 A | 2/2008 |
| JP | 2013-168353 | 8/2013 |
| JP | 2013-239316 | 11/2013 |
| JP | 2014-225335 | 12/2014 |
| JP | 2016-051518 A | 4/2016 |
| JP | 2016-058161 | 4/2016 |
| JP | 2017-013273 | 1/2017 |
| JP | 2017-183198 A | 10/2017 |

\* cited by examiner

MANUFACTURING METHOD OF UNIT CELL OF FUEL CELL

CROSS-REFERENCE TO RELATED APPLICATION

This application is based upon and claims the benefit of priority of the prior Japanese Patent Application No. 2017-198047, filed on Oct. 11, 2017, the entire contents of which are incorporated herein by reference.

FIELD OF THE INVENTION

The present invention relates to a manufacturing method of a unit cell of a fuel cell.

BACKGROUND

A unit cell of a fuel cell includes a frame member supporting a membrane-electrode-gas diffusion layer assembly, and a pair of separators sandwiching the frame member. In joining the frame member and the pair of separators, a thermoplastic adhesive bond is provided on both surfaces of the frame member, and then the frame member and the pair of separators are heated and pressed in a state where the pair of separators sandwich the frame member (See, for example, Japanese Unexamined Patent Application Publication No. 2014-225335).

Depending on the configuration of the unit cell, one of the separators may be joined to only one surface of the frame member. In this case, a thermoplastic adhesive bond is provided only on one surface of the frame member. When these members are heated in joining the frame member and the separator, warpage might occur in the frame member due to a difference in linear expansion coefficient between the frame member and the adhesive bond. This might influence the sealing property between the frame member and the separator.

SUMMARY OF THE INVENTION

It is an object of the present invention to provide a manufacturing method of a unit cell of a fuel cell suppressing occurrence of warpage in a frame member.

The above object is achieved by a manufacturing method of a unit cell of a fuel cell, including: preparing a frame member made of resin, first adhesive bonds being provided on one surface of the frame member and being separated from each other and each having thermoplasticity; preparing a separator; and joining the frame member and the separator by heating and pressing the frame member and the separator in a state where the one surface of the frame member faces the separator through the first adhesive bonds, so as to melt the first adhesive bonds to be brought into contact with each other.

Each of the first adhesive bonds expands in heating, but a clearance between the first adhesive bonds separated from each other absorb this expansion. This suppresses the occurrence of warpage in the frame member due to the difference in linear expansion coefficient between the first adhesive bond and the frame member.

The above method may further include: preparing a membrane-electrode-gas diffusion layer assembly including: an electrolyte membrane; a first catalyst layer formed on one surface of the electrolyte membrane so as to expose a peripheral region of the one surface of the electrolyte membrane; a second catalyst layer formed on another surface of the electrolyte membrane; a first gas diffusion layer joined to the first catalyst layer so as to expose the peripheral region; and a second gas diffusion layer joined to the second catalyst layer; and joining a part of the one surface of the frame member in an inner peripheral edge side to the peripheral region of the electrolyte membrane with a second adhesive bond, before the joining of the frame member and the separator.

In the preparing of the frame member, clearances between the first adhesive bonds in a predetermined direction may be same size.

In the preparing of the frame member, the first adhesive bonds may be same size and same shape.

In the preparing of the frame member, the first adhesive bonds may be separated from each other such that each of the first adhesive bonds is surrounded in an imaginary square having a side length of 20 mm.

In the preparing of the frame member, the first adhesive bonds may be separated from each other such that each of the first adhesive bonds is surrounded in an imaginary square having a side length of one-tenth of a side length of the frame member.

The first adhesive bond may be modified polyolefin including at least one polyolefin including a functional group.

The modified polyolefin may include: any one of or combination of silane coupling agent; epoxy resin; urethane resin; acid anhydride including maleic anhydride; carboxylic acid including acrylic acid and methacrylic acid; and alcohols including vinyl alcohol and ethylhexyl acrylate.

DETAILED DESCRIPTION

Figure 1:
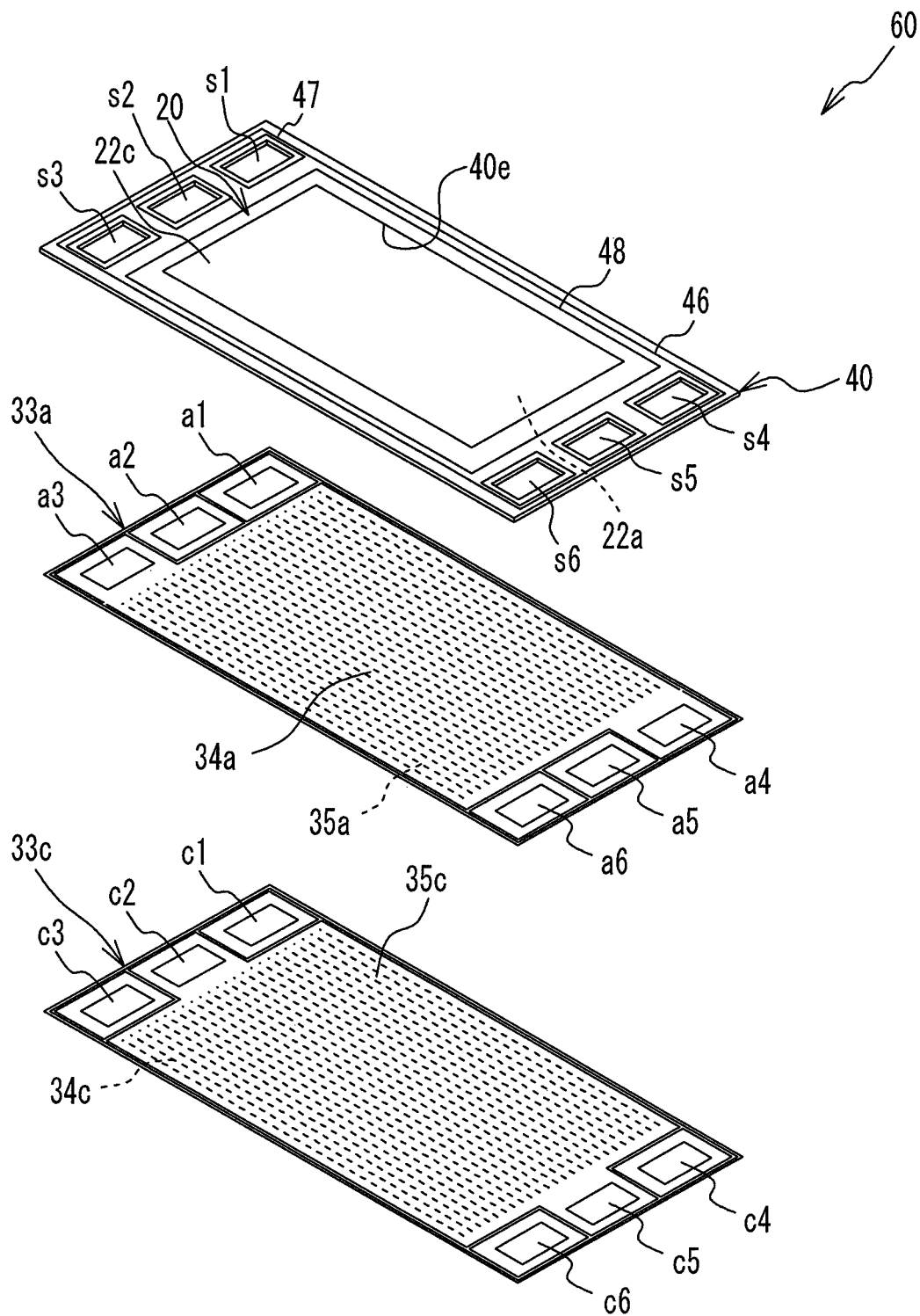
FIG. 1 is an exploded perspective view of a unit cell of a fuel cell.

FIG. 1 is an exploded perspective view of a unit cell 60 of a fuel cell. The fuel cell is configured by stacking the unit cells 60. This fuel cell is a polymer electrolyte fuel cell that generates electric power by receiving a fuel gas (for example, hydrogen) and an oxidant gas (for example, oxygen) as reaction gases. The unit cell 60 includes a membrane-electrode-gas diffusion layer assembly 20 (hereinafter referred to as MEGA (Membrane Electrode Gas diffusion layer Assembly)) and an anode side separator 33a and a cathode side separator 33c (hereinafter referred to as a separator). The MEGA 20 includes an anode side gas diffusion layer 22a and a cathode side gas diffusion layer 22c (hereinafter referred to as a diffusion layer).

A frame member 40, made of resin, having an insulating property, is formed into a substantially frame shape. The outer peripheral edge of the frame member 40 is larger than the MEGA 20. An inner peripheral edge 40$e$ is smaller than the electrolyte membrane 11 of the MEGA 20 described later. The MEGA 20 is joined to the inner peripheral edge 40$e$ side of the frame member 40. Holes s1 to s3 are formed along one of two short sides of the frame member 40, and holes s4 to s6 are formed along the other side. Likewise, holes a1 to a3 are formed along one of two short sides of the separator 33$a$, and holes a4 to a6 are formed along the other side. Holes c1 to c3 are formed along one of two short sides of the separator 33$c$, and holes c4 to c6 are formed along the other side. The holes s1, a1, and c1 communicate to one another and define a cathode inlet manifold. Likewise, the holes s2, a2 and c2 define a coolant outlet manifold. The holes s3, a3 and c3 define an anode outlet manifold. The holes s4, a4 and c4 define an anode inlet manifold. The holes s5, a5, and c5 define a coolant inlet manifold. The holes s6, a6, and c6 define a cathode outlet manifold.

A surface of the separator 33$a$ facing the MEGA 20 is formed with anode flow paths 34$a$ along which the fuel gas flows and which communicate between the anode inlet manifold and the anode outlet manifold. A surface of the separator 33$a$ opposite to the anode flow path 34$a$, and a surface of the separator 33$c$ facing the separator 33$a$ are respectively formed with coolant flow paths 35$a$ and 35$c$ along which the coolant flows and which communicate between the coolant inlet manifold and the coolant outlet manifold. A surface of the separator 33$c$ opposite to the coolant flow path 35$c$ is formed with cathode flow paths 34$c$ along which the oxidant gas flows and which communicate the cathode inlet manifold and the cathode outlet manifold. Additionally, the separators 33$a$ and 33$c$ are made of material with a gas barrier property and electro-conductivity, and may be made of a pressed stainless steel, a thin plate-shaped member made of metal such as titanium and titanium alloy, or a carbon member such as dense carbon.

Gaskets 46 to 48 are provided on the frame member 40. The gasket 46 has a frame shape along the outer peripheral edge of the frame member 40. The gaskets 47, each having a frame shape, are provided around the respective holes s1 to s6 and surround the respective holes s1 to s6. The gasket 48 has a frame shape surrounding the MEGA 20. The gaskets 46 to 48 are made of elastic rubber. The gaskets are not limited to the above configuration. For example, the gasket 47 may not be formed around the holes s3 and s4 respectively forming the cathode inlet manifold and the cathode outlet manifold, and the gasket 48 may not be provided. In another configuration, there may be provided the gasket 49 that entirely surrounds the MEGA 20 and the holes s3 and s4 respectively forming the cathode inlet manifold and the cathode outlet manifold, and the gaskets 46 and 48 may not be provided. With these configurations, the gaskets 47 can surround and seal the anode inlet manifold, the anode outlet manifold, the coolant inlet manifold, and the coolant outlet manifold, and the gaskets 46 and 47 or the gasket 49 can seal the cathode inlet manifold, the cathode outlet manifold, and the cathode flow path separated from the anode inlet manifold, the anode outlet manifold, the coolant inlet manifold, and the coolant outlet manifold. The gaskets 46 to 48 are separately formed and joined on the frame member 40, but not limited thereto. The frame member 40 and at least one of the gaskets 46 to 48 may be integrally formed and made of the same material or different materials.

Figure 2:
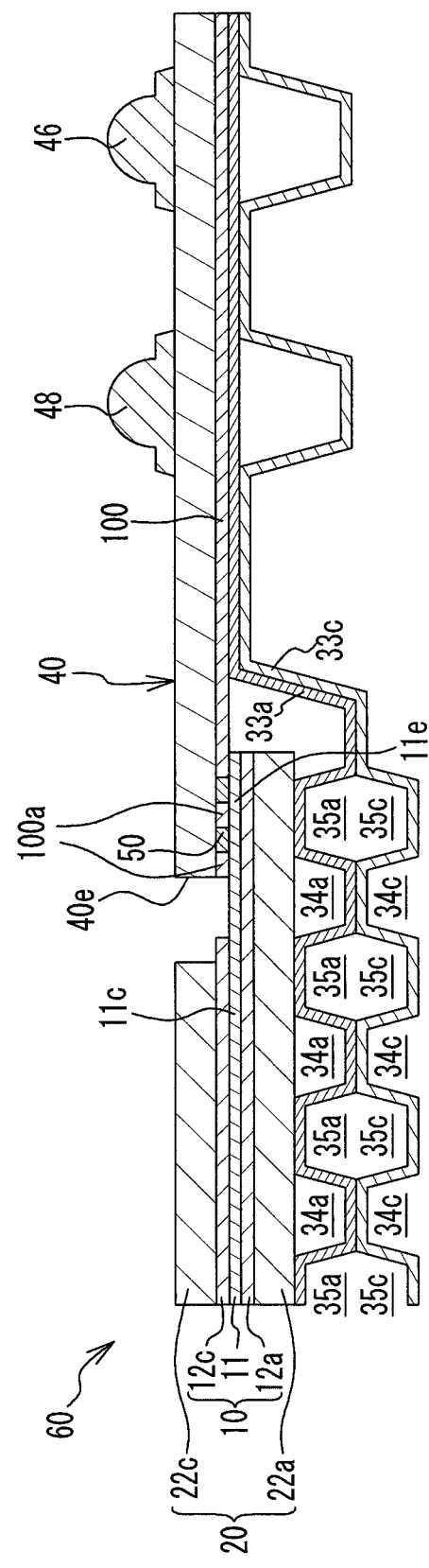
FIG. 2 is a partially cross-sectional view of the unit cell of the fuel cell.

FIG. 2 is a partially cross-sectional view of the unit cell 60. Specifically, FIG. 2 illustrates a part of a cross section perpendicular to the longitudinal direction of the unit cell 60. The MEGA 20 includes the above-described diffusion layers 22$c$ and 22$a$ and a membrane electrode assembly (hereinafter referred to as MEA) 10. The MEA 10 includes an electrolyte membrane 11 having a substantially rectangular shape, and a cathode side catalyst 12$c$ and an anode side catalyst 12$a$ (hereinafter referred to as a catalyst layer) respectively formed on an upper surface and a lower surface of the electrolyte membrane 11 in FIG. 2. The electrolyte membrane 11 is a solid polymer thin film, such as a fluorine-based ion exchange membrane, with high proton conductivity in a wet state. The electrolyte membrane 11 has a peripheral region 11$e$ and a central region 11$c$ surrounded by the peripheral region 11$e$.

The catalyst layer 12$c$ is formed in the central region 11$c$ on the upper surface of the electrolyte membrane 11 but not in the peripheral region 11$e$. The catalyst layer 12$a$ is formed so as to substantially align its end with the end of the electrolyte membrane 11. That is, the catalyst layer 12$a$ is formed substantially over the entire lower surface of the electrolyte membrane 11 including the peripheral region 11$e$ and the central region 11$c$ of the electrolyte membrane 11. The catalyst layer 12$c$ is an example of a first catalyst layer formed on one surface of the electrolyte membrane 11 so as to expose the peripheral region 11$e$ of the upper surface of the electrolyte membrane 11. The catalyst layer 12$a$ is an example of a second catalyst layer formed on the other surface of the electrolyte membrane 11. The catalyst layers 12$a$ and 12$c$ are made by coating a catalyst ink containing a carbon support carrying platinum (Pt) or the like and an ionomer having proton conductivity on the electrolyte membrane 11.

The diffusion layers 22$c$ and 22$a$ are joined to the catalyst layers 12$c$ and 12$a$, respectively. The diffusion layers 22$c$ and 22$a$ are made of a material having gas permeability and electro-conductivity, for example, a porous fiber base material such as carbon fiber or graphite fiber. The diffusion layer 22$c$ is provided so as to position an end thereof slightly inwardly from the end of the catalyst layer 12$c$ or to substantially align the end of the diffusion layer 22$c$ therewith. Thus, the diffusion layer 22$c$ is provided so as to overlap the central region 11$c$ of the electrolyte membrane 11 through the catalyst layer 12$c$ but not to overlap the peripheral region 11$e$. Accordingly, the diffusion layer 22$c$ is provided so as to expose the peripheral region 11$e$. The diffusion layer 22$c$ is an example of a first gas diffusion layer joined to the catalyst layer 12$c$ so as to expose the peripheral region 11$e$. The diffusion layer 22$a$ is an example of a second gas diffusion layer joined to the catalyst layer 12$a$.

Likewise, the diffusion layer 22$a$ is provided so as to substantially align its end with an end of the catalyst layer 12$a$, and the catalyst layer 12$a$ is formed substantially over the entire lower surface of the electrolyte membrane 11 as described above. Therefore, the diffusion layer 22$a$ is provided so as to overlap not only the central region 11$c$ but also the peripheral region 11$e$ through the catalyst layer 12$a$. Since the diffusion layer 22$a$ is provided so as to also overlap the peripheral region 11$e$ in such a way, the MEA 10 is stably supported.

The frame member 40 is a member for preventing cross leak and electrical short circuit between catalyst electrodes. The frame member 40 is joined to the separator 33$a$. The separator 33$c$ is joined to the other side of the separator 33$a$ opposite to one side thereof to which the frame member 40 is joined.

In FIG. 2, the lower surface of the frame member 40 is joined to the separator 33a with an adhesive bond 100. The adhesive bond 100 is a thermoplastic resin. The lower surface of the frame member 40 in the side of the inner peripheral edge 40e is joined to the peripheral region 11e of the electrolyte membrane 11 with adhesive bonds 50 and adhesive bonds 100a that has a dot shape maintained from before the adhesive bond 100 melts.

The unit cells 60 are stacked to configure the fuel cell. Thus, in the fuel cell, the MEGA 20 and the frame member 40 illustrated in FIG. 2 are sandwiched between the illustrated separator 33a and a cathode separator of non-illustrated another unit cell adjacent to the upper side of the unit cell 60 of FIG. 2. Further, an MEGA and a frame member of another non-illustrated unit cell adjacent to the lower side of the unit cell 60 of FIG. 2 are sandwiched between the anode separator of this non-illustrated unit cell and the separator 33c of FIG. 2. Furthermore, the gaskets 46 to 48 are compressed by a cathode separator of the other non-illustrated unit cell adjacent to the upper side of the unit cell 60.

Figure 3:
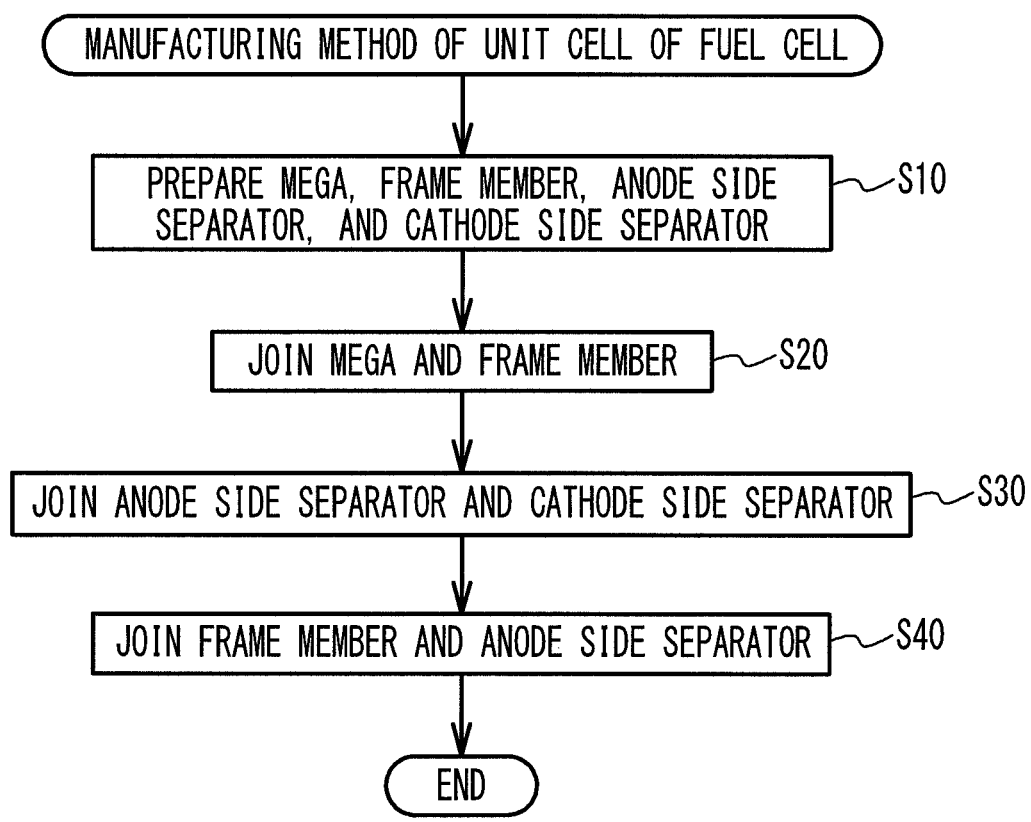
FIG. 3 is a flowchart illustrating a manufacturing method of the unit cell.
Figure 4A:
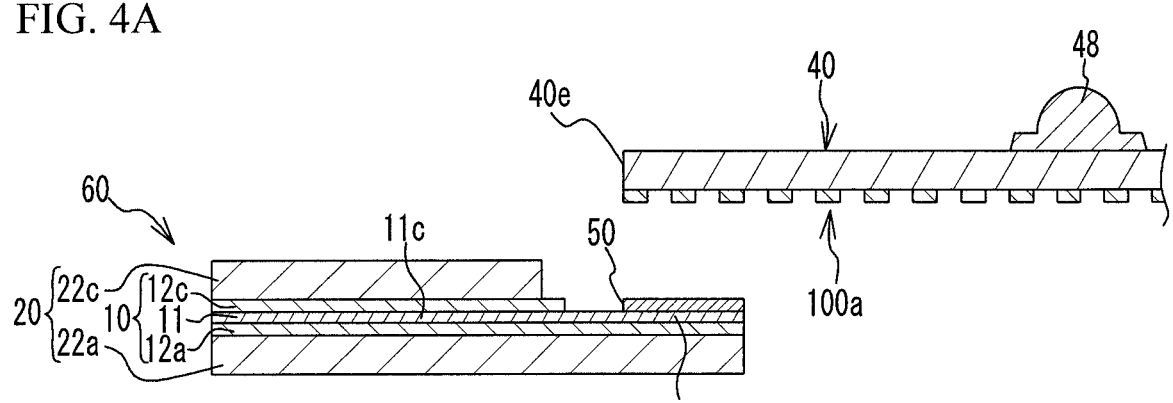
FIGS. 4A to 4D are explanatory views of the manufacturing method of the unit cell.

Next, a manufacturing method of the unit cell 60 will be described. FIG. 3 is a flowchart illustrating the manufacturing method of the unit cell 60. FIGS. 4A to 4D are explanatory views of the manufacturing method of the unit cell 60. Firstly, the MEGA 20, the frame member 40, and the separators 33a and 33c are prepared (step S10). Herein, as illustrated in FIG. 4A, the adhesive bonds 100a separated from one another are formed over substantially the entire lower surface of the frame member 40. Specifically, the adhesive bonds 100a are formed into a dot shape, and are arranged in a lattice pattern as a whole. The adhesive bonds 100a are in a state before the above-described adhesive bond 100 melts. The adhesive bond 100 is a thermoplastic resin as described above, and each shape of the adhesive bonds 100a is maintained before the adhesive bond 100 melts. Step S10 is an example of preparing the frame member 40 made of resin, the adhesive bonds 100a being provided on one surface of the frame member 40 and being separated from each other and each having thermoplasticity, an example of preparing the separator 33a, and an example of preparing the MEGA 20.

Figure 4B:
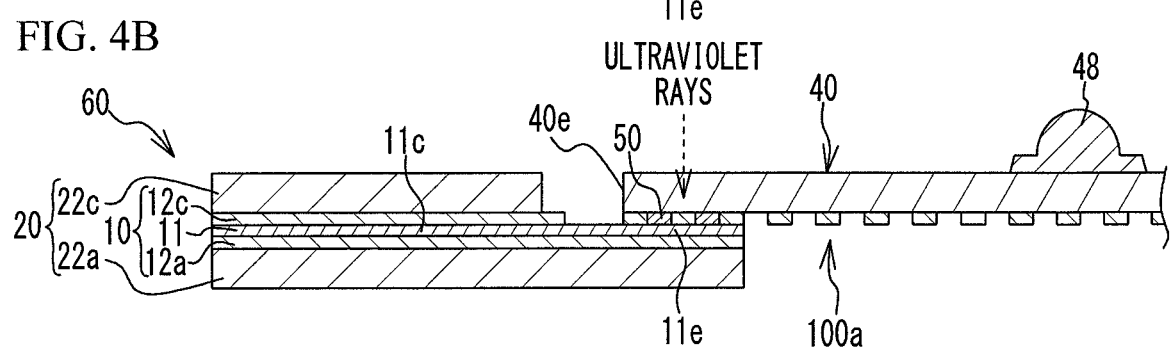

Next, the peripheral region 11e of the electrolyte membrane 11 of the MEGA 20 and the lower surface of the inner peripheral edge 40e side of the frame member 40 are joined with the adhesive bonds 50 which are ultraviolet curing resins (step S20). Specifically, the lower surface of the frame member 40 in the inner peripheral edge 40e side is brought into contact with the adhesive bond 50 that is applied on the peripheral region 11e by a dispenser or the like, and then ultraviolet rays are irradiated from the upper side of the frame member 40 to the peripheral region 11e as illustrated in FIG. 4B, thereby curing the adhesive bonds 50 joining the frame member 40 to the MEGA 20. Herein, the frame member 40 is made of a material having ultraviolet transparency. Further, the adhesive bonds 50 entering clearances between the adhesive bonds 100a are cured on the inner peripheral edge 40e side of the frame member 40.

Figure 4C:
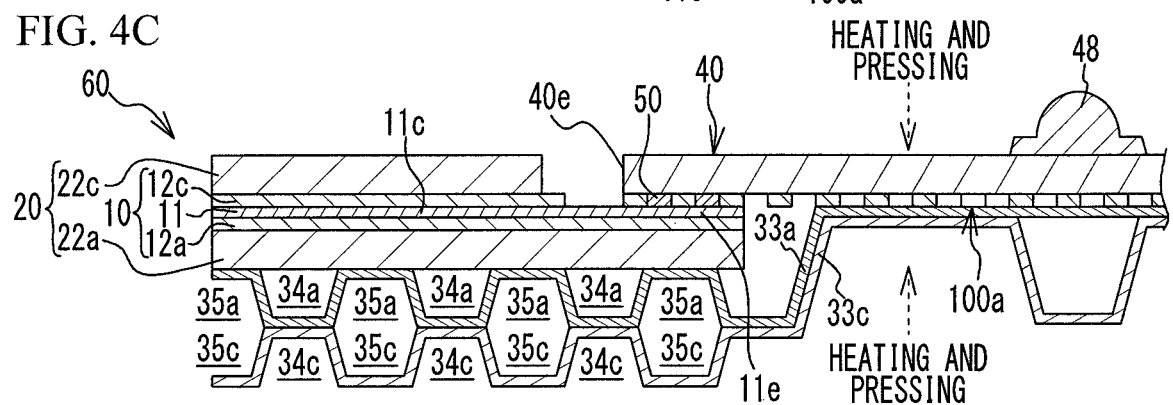
Figure 4D:
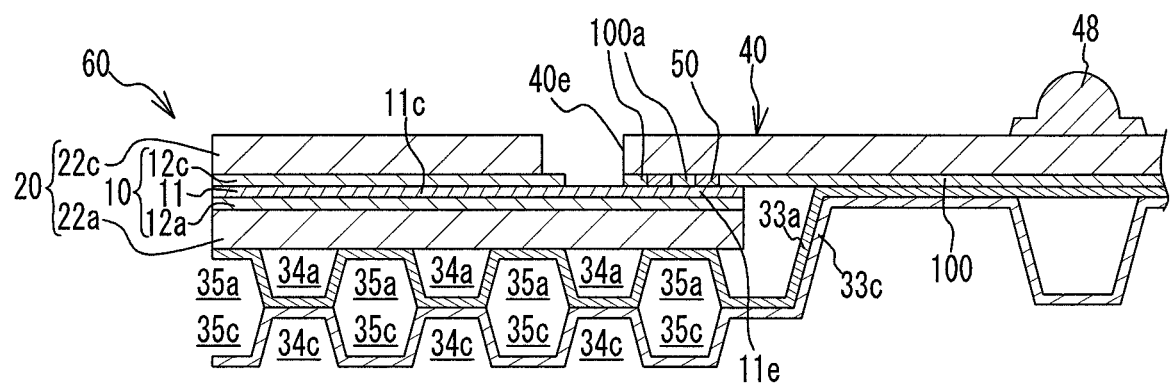

Next, the separators 33c and 33a are joined by adhesion or welding (step S30). Next, the frame member 40 and the separator 33a are joined to each other with the adhesive bonds 100a (step S40). Specifically, as illustrated in FIG. 4C, in a state where the frame member 40 and the separator 33a in contact with each other through the adhesive bonds 100a, the frame member 40 and the separators 33a and 33c are heated and pressed by hot pressing dies. Accordingly, the adhesive bonds 100a melt and spread on the frame member 40 in the planar direction. Thus, as illustrated in FIG. 4D, the adjacent adhesive bonds 100a come into contact with one another to fill the clearances among the adhesive bonds 100a, which forms the adhesive bond 100 continuous on the frame member 40 in the planar direction. After that, the heating is stopped and the adhesive bond 100 is cooled and cured, and then the pressure is released, so that the frame member 40 and the separator 33a are joined to each other. This ensures the sealing property between the frame member 40 and the separator 33a. In addition, the order of the steps S30 and S40 may be reversed. In a case of performing step S30 after step S40, the separators 33c and 33a are joined to each other by adhesion or welding at a temperature equal to or lower than the melting temperature of the adhesive bonds 100a in step S30.

Since the adhesive bond 50 has already been cured in the clearances among the adhesive bonds 100a in the inner peripheral edge 40e side of one surface of the frame member 40, the adhesive bonds 100a provided in the inner peripheral edge 40e side of the frame member 40 do not come into contact with one another and join the inner peripheral edge 40e side of the frame member 40 and the peripheral region 11e of the electrolyte membrane 11. Step S40 is an example of joining the frame member 40 and the separator 33a by heating and pressing the frame member 40 and the separator 33a in a state where one surface of the frame member 40 faces the separator 33a through the adhesive bonds 100a, so as to melt the adhesive bonds 100a to be brought into contact with each other. Step S20 is an example of joining one surface of the inner peripheral edge 40e side of the frame member 40 and the peripheral region 11e of the electrolyte membrane 11 with the adhesive bond 50, before the joining of the frame member 40 and the separator 33a.

Figure 5A:
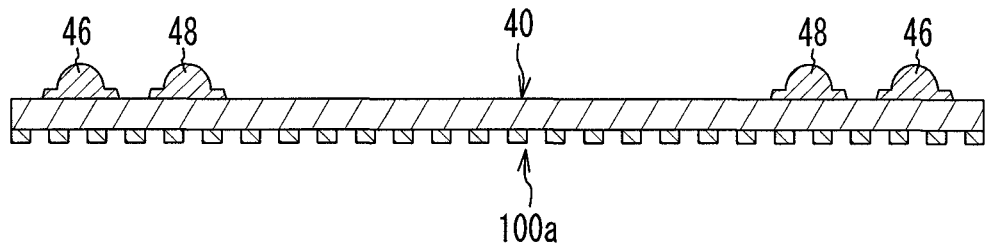
FIG. 5A is a cross-sectional view of a frame member before being joined to a separator.
Figure 5B:
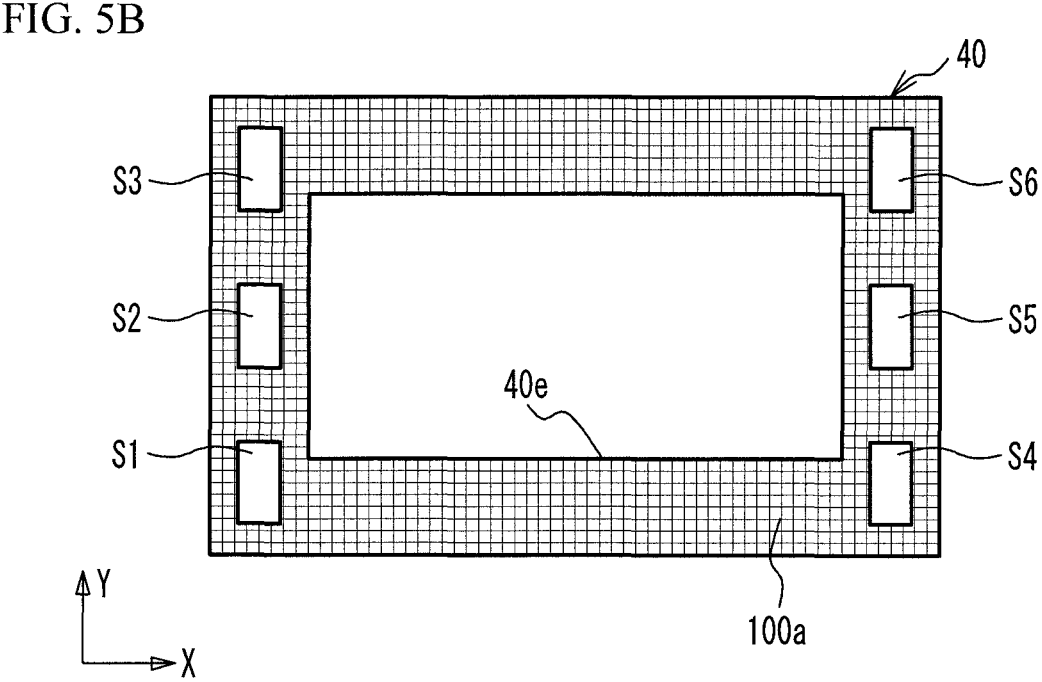
FIG. 5B is a front view of a surface of the frame member on which adhesive bonds are formed.
Figure 5C:
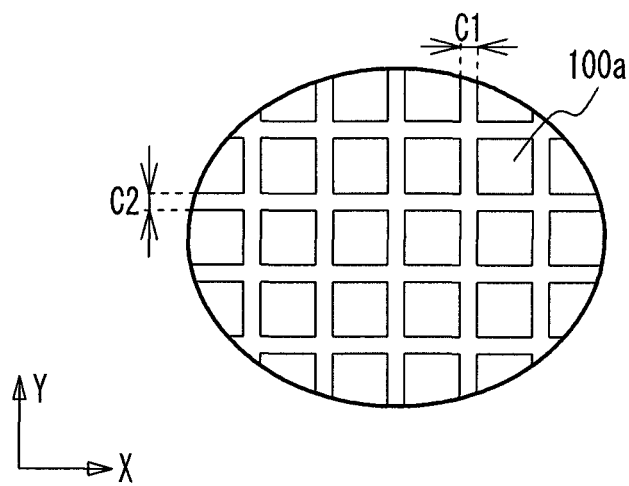
FIG. 5C is a partially enlarged view of FIG. 5B.

Next, the adhesive bonds 100a will be described in detail. FIG. 5A is a cross-sectional view of the frame member 40 before being joined to the separator 33a. FIG. 5B is a front view of the surface of the frame member 40 on which the adhesive bonds 100a are formed. FIG. 5C is a partially enlarged view of FIG. 5B. In FIGS. 5B and 5C, the longitudinal direction of the frame member 40 is indicated as an X direction, and the short direction is indicated as a Y direction. The adhesive bonds 100a are provided on one surface of the frame member 40, for example, by transfer or screen printing. Further, an adhesive bond having a sheet shape may be pasted to one surface of the frame member 40 by screen printing or the like, and then a die may be pressed to the adhesive bond in a state where the adhesive bond is heated to have fluidity, which may form the adhesive bonds 100a having a dot shape. As illustrated in FIG. 5C, each of the adhesive bonds 100a has a substantially square shape, and the adhesive bonds 100a are arranged in a lattice pattern. Furthermore, clearances C1 between the adhesive bonds 100a adjacent in the X direction are substantially constant, and clearances C2 between the adhesive bonds 100a adjacent in the Y direction are substantially constant. Herein, the clearances C1 and C2 are substantially the same size. Each of the clearances C1 and C2 is shorter than each length of a side of the single adhesive bond 100a extending in the X direction and a side thereof extending in the Y direction.

The frame member 40 is made of a material having a relatively low linear expansion coefficient in order to suppress the thermal expansion in the heating step described above. For example, the material of the frame member 40 is polyethylene naphthalate, polyphenylene sulfide, or syndiotactic polystyrene. In contrast, the material of the adhesive bond 100a is made of a material that has a linear expansion coefficient greater than that of the frame member

40. Specifically, the adhesive bond 100*a* is modified polyolefin including at least one polyolefin including a functional group. Specifically, the modified polyolefin preferably includes: any one of or combination of silane coupling agent; epoxy resin; urethane resin; acid anhydride including maleic anhydride; carboxylic acid including acrylic acid and methacrylic acid; and alcohols including vinyl alcohol and ethyihexyl acrylate. For example, maleic acid-modified polypropylene can be used. Polyolefin is usually nonpolar and difficult to adhere to a metal. However, polyolefin is polar by incorporating the above additive thereinto, and adhesion to a metal is improved.

Figure 6A:
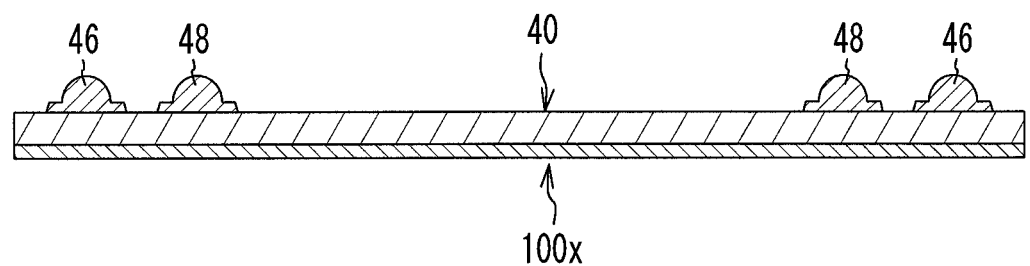
FIGS. 6A and 6B are explanatory views of a comparative example of a joining method of the frame member and the separator.
Figure 6B:
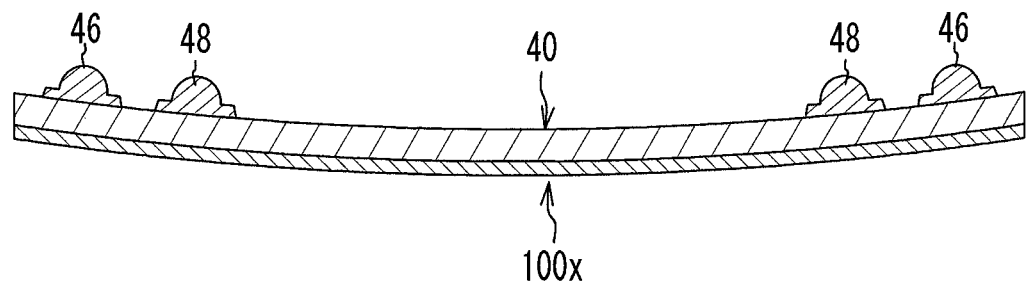

Next, a description will be given of a comparative example of a joining method of the frame member 40 and the separator 33*a*. FIGS. 6A and 6B are explanatory views of the comparative example of the joining method of the frame member 40 and the separator 33*a*. In the comparative example, the frame member 40 and the separator 33*a* are joined with an adhesive bond 100*x* formed continuously on one surface of the frame member 40. In heating the frame member 40 and the separator 33*a* brought into contact with each other through the adhesive bond 100*x*, before the adhesive bond 100*x* melt, warpage might occur in the frame member 40 due to the difference in linear expansion coefficient between the frame member 40 and the adhesive bond 100*x*.

FIG. 6B is an explanatory view of warpage occurring in the frame member 40. For example, in a case where the linear expansion coefficient of the adhesive bond 100*x* is greater than that of the frame member 40, the expansion coefficient of the adhesive bond 100*x* is greater than that of the frame member 40. Thus, the expansion of the frame member 40 in the planar direction is smaller than that of the adhesive bond 100*x* in the planar direction, and the frame member 40 is bent so as to be convex toward the adhesive bond 100*x* as illustrated in FIG. 6B. If the adhesive bond 100*x* melts in such a state and then joins the frame member 40 and the separator 33*a*, the frame member 40 in which warpage occurs might be joined to the separator 33*a*. Moreover, the internal stress might remain in the frame member 40 or the adhesive bond 100*x*, after the frame member 40 and the separator 33*a* are joined to each other. This might not suitably ensure the sealing property between the frame member 40 and the separator 33*a*.

Further, in order to suppress the occurrence of warpage described above, it is considered to form the adhesive bond 100*x* on both surfaces of the frame member 40. However, in this case, the adhesive bond 100*x* provided on the upper surface of the frame member 40 might adhere to the hot pressing die in joining the frame member 40 and the separator 33*a*, which might make it difficult to peel the frame member 40 from the hot pressing die, and then productivity might decrease.

Since the adhesive bonds 100*a* are discontinuous through the clearances C1 and C2 as described above in the present embodiment, even if each adhesive bonds 100*a* expand in heating, the expansion amount is absorbed by the clearances C1 and C2. This suppresses the occurrence of warpage in the frame member 40. In the present embodiment, it is therefore possible to join the frame member 40 to the separator 33*a* while suppressing the occurrence of warpage in the frame member 40, thereby ensuring the sealing property between the frame member 40 and the separator 33*a*. Furthermore, since the adhesive bonds 100*a* are not provided on the upper surface of the frame member 40, the frame member 40 is easily peeled off from the hot pressing die, and a decrease in productivity is also suppressed.

Additionally, the clearances C1 are substantially the same size, the clearances C2 are substantially the same size, and the clearances C1 and C2 are also substantially the same size. This suppresses the adjacent adhesive bonds 100*a* from partially not contacting with each other. This also ensures the sealing property.

Further, the adhesive bonds 100*a* are substantially the same size and the same shape. Size also includes thickness. Therefore, the adhesive bonds 100*a* melted and spread are also substantially the same shape. Thus, the uniform joining force can exert on any part between the frame member 40 and the separator 33*a*. Furthermore, since the adhesive bonds 100*a* are the same shape and the same size, it is easy to form the adhesive bonds 100*a* on the frame member 40, as compared with a case where the adhesive bonds are different shape and different size. Moreover, since the adhesive bonds 100*a* are the same shape and the same size, it is easy to reduce each area of the adhesive bonds 100*a* in the planar direction as described later.

Also, the clearances C1 are substantially the same size, the clearances C2 are substantially the same size, and the clearances C1 and C2 are also substantially the same size and the same shape. This can suppress variations in thickness of the adhesive bond 100 after the adhesive bonds 100*a* melt to come into contact with one another. It is also possible to ensure the sealing property.

Each area of the adhesive bonds 100*a* in the planar direction is preferably small. When each adhesive bond 100*a* is small, the expansion coefficient in the planar direction in heating is small, and the small stress exerts on the frame member 40 from each adhesive bond 100*a*. This can suppress the occurrence of warpage in the frame member 40.

In the present embodiment, each adhesive bond 100*a* is formed into a square shape having one side length of 5 mm. Although the size of the adhesive bond 100*a* is not limited, the adhesive bond 100*a* is preferably surrounded in an imaginary square having one side of 20 mm, more preferably 10 mm. In the frame member having long sides and short sides, the size of the adhesive bond 100*a* is not limited, but the adhesive bond 100*a* is preferably surrounded in an imaginary square having one side of one-tenth, more preferably one-twentieth of the long side length of the frame member. Herein, in the present embodiment, the long side length of the frame member 40 is about 300 mm, and the short side length thereof is about 150 mm. One side length of the adhesive bond 100*a* is one-sixteenth of the long side length of the frame member 40, and is one-thirtieth of the short side length thereof. In the present embodiment, one side of the adhesive bond 100*a* is surrounded in an imaginary square having one side length of one-twentieth of any length of the long and short sides of the frame member 40. One side of the adhesive bond 100*a* is surrounded in an imaginary square having one side length of one-tenth of the long side length of the frame member 40, but may not be surrounded in an imaginary square having one side length of one-tenth of the short side length of the frame member 40. Additionally, in a case of a frame member having four sides that are the same length, one side of the adhesive bond 100*a* is preferably surrounded in an imaginary square having one side length of one-tenth, more preferably one-twentieth of any side length of the frame member.

As described above, in the case where the adhesive bonds 100*a* are formed over the entire surface of the frame member 40, even in the completed unit cell 60, there are the adhesive bonds 50 and the adhesive bonds 100*a* having a dot shape and separated from one another, between the inner peripheral edge 40*e* side of the frame member 40 and the peripheral region 11e. Therefore, the existence of the adhesive bonds separated from one another in this region is an evidence that the unit cell is manufactured by the same manufacturing method as the present embodiment.

In the present embodiment, the adhesive bond 50 is an ultraviolet curable resin, but not limited thereto, and it may be a thermoplastic resin. In this case, without using an adhesive bond of different type from the adhesive bonds 100a, only the inner peripheral edge side of the adhesive bonds 100a may be melted by heating only the inner peripheral edge 40e side of the frame member 40 facing the peripheral region of the MEGA 20, which may join the MEGA 20 and the frame member 40 to each other. At this time, joining may be performed while the outer peripheral region is cooled so as not to heat the outer peripheral region excluding the inner peripheral edge 40e side of the frame member 40. Further, the adhesive bond 50 may be a thermosetting resin. Also in this case, the thermosetting resin having a curing temperature lower than the melting point of the adhesive bond 100a is used as the adhesive bond 50, in order that the adhesive bonds 100a do not melt in the heating and joining of the MEGA 20 and the frame member 40.

Figure 7A:
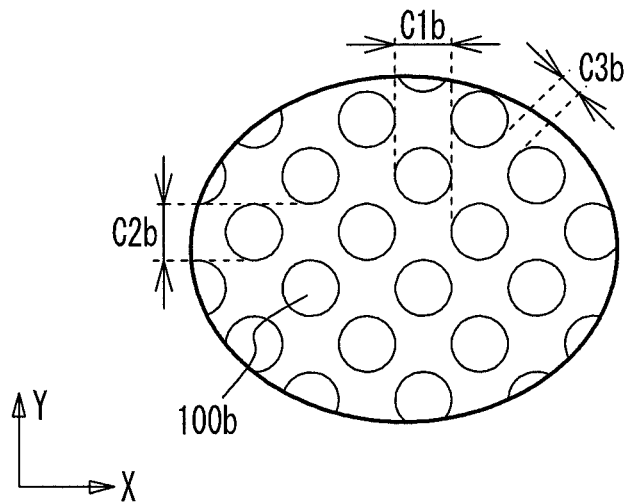
FIGS. 7A to 7C are explanatory views of variations different in shape of the adhesive bond.
Figure 7B:
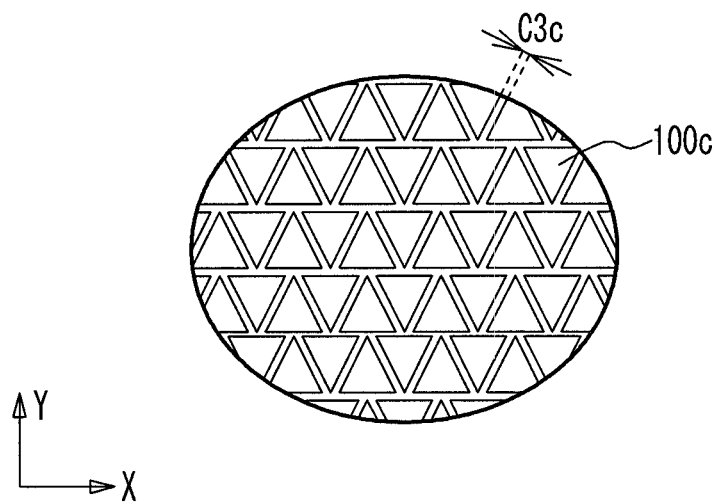
Figure 7C:
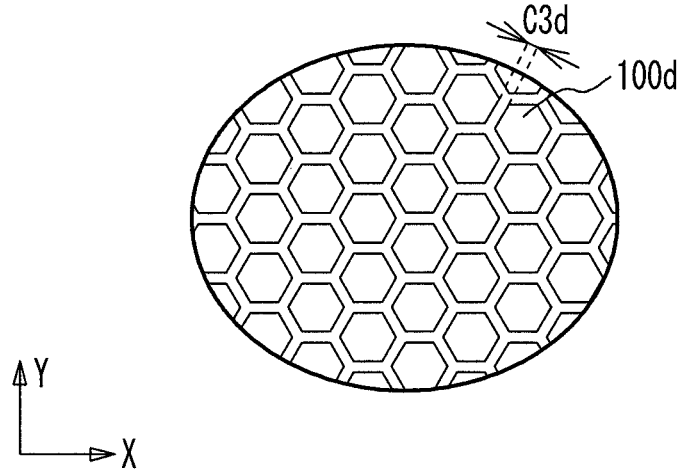

Next, a description will be given of variations different in shape of the adhesive bond. FIGS. 7A to 7C are explanatory views of the variations different in the shape of the adhesive bond. In the variations in shape of the adhesive bond, similar components are represented with the similar reference numerals, and duplicated explanation is omitted. FIG. 7A illustrates an example in which adhesive bonds 100b each having a substantially perfect circular shape are arranged in a zigzag manner. A clearance C1b between the adhesive bonds 100b adjacent to each other in the X direction is substantially constant. Likewise, a clearance C2b between the adhesive bonds 100b adjacent to each other in the Y direction is substantially constant. A clearance C3b between the adhesive bonds 100b adjacent to each other in the direction inclined at 45 degrees with respect to each of the X direction and the Y direction is also substantially constant. The clearances C1b and C2b are substantially the same size. The clearance C3b is smaller than each of the clearances C1b and C2b. The adhesive bonds 100b having such a shape can also suppress the occurrence of warpage in the frame member 40.

FIG. 7B illustrates an example in which adhesive bonds 100c each having a substantially equilateral triangular shape are arranged in a zigzag manner. The adhesive bonds 100c adjacent to each other in the X direction are arranged such that a side of one thereof and a side of the other facing each other are parallel to each other. Also, the adhesive bond 100c are arranged such that one side of the adhesive bond 100c is parallel to the X direction. A clearance C3c between the facing sides of these adhesive bonds 100c is substantially constant. FIG. 7C illustrates an example in which adhesive bonds 100d each having a substantially regular hexagonal shape are arranged in a zigzag manner. The adhesive bonds 100d are arranged such that a side of one thereof and a side of the other face each other. A clearance C3d between the facing sides of these adhesive bonds 100d is substantially constant.

An adhesive bond for joining the frame member 40 and the separator 33a is not limited to the above-described shape, and may be, for example, a polygonal shape such as a rectangular shape, a substantially elliptic shape, or a substantially annular shape. Also, the above-described adhesive bonds 100a to 100d do not always have to be arranged in the X direction or the Y direction in the above manner. Further, in the above variations, any size of the adhesive bonds 100b, 100c, and 100d are not limited, but any side thereof is preferably surrounded in an imaginary square having a side length of, for example, 20 mm, more preferably 10 mm. Furthermore, as for a frame member having long sides and short sides, any size of the adhesive bonds 100b, 100c, and 100d are not limited, but any side thereof is preferably surrounded in an imaginary square having a side length of one-tenth, more preferably one-twentieth of the long side length of the frame member. Moreover, any side of the adhesive bonds 100b, 100c, and 100d is surrounded in an imaginary square having one side length of one-tenth of the long side length of the frame member, but may not be surrounded in an imaginary square having one side length of one-tenth of the short side length of the frame member. In a case of a frame member having the same length of four sides, any side length of the adhesive bonds 100b, 100c, and 100d is preferably surrounded in an imaginary square having a side length of one-tenth, more preferably one-twentieth of any side length of the frame member.

Further, in the present embodiment and the variations, a clearance may be formed at a part of the adhesive bond 100 that is formed after the respective adhesive bonds 100a to 100d melt and join the frame member 40 and the separator 33a. Such a clearance may be partially formed as long as the clearance is not positioned near the outer peripheral edge of the frame member 40 and the inner peripheral edge 40e, on lines around the holes s1 to s6 defining the manifolds. This is because the sealing property can be ensured.

Since the adhesive bonds 100a are formed over the entire surface of one surface of the frame member 40 in the above embodiment, the adhesive bond 50 enters the clearance of the adhesive bonds 100a in the inner peripheral edge 40e side of one surface of the frame member 40 as illustrated in FIGS. 4B and 4C, but is not limited thereto. That is, in the inner peripheral edge 40e side of the frame member 40, the adhesive bonds 100a may not be formed by mask processing or the like.

Although some embodiments of the present invention have been described in detail, the present invention is not limited to the specific embodiments but may be varied or changed within the scope of the present invention as claimed.

What is claimed is:

1. A manufacturing method of a unit cell of a fuel cell, comprising:
    preparing a frame member made of resin, first adhesive bonds being provided on a first surface of the frame member and being separated from each other and each having thermoplasticity in a solid state, and a gasket being provided on a second surface of the frame member;
    preparing a separator; and
    joining the frame member and the separator by heating and pressing the frame member and the separator in a state where the first surface of the frame member faces the separator through the first adhesive bonds, so as to melt the first adhesive bonds to be brought into contact with each other.

2. The manufacturing method of the unit cell of the fuel cell of claim 1, further comprising:
    preparing a membrane-electrode-gas diffusion layer assembly including:
        an electrolyte membrane;
        a first catalyst layer formed on one surface of the electrolyte membrane so as to expose a peripheral region of the one surface of the electrolyte membrane;

a second catalyst layer formed on another surface of the electrolyte membrane;

a first gas diffusion layer joined to the first catalyst layer so as to expose the peripheral region; and a second gas diffusion layer joined to the second catalyst layer; and joining a part of the first surface of the frame member in an inner peripheral edge side to the peripheral region of the electrolyte membrane with a second adhesive bond, before the joining of the frame member and the separator.

3. The manufacturing method of the unit cell of the fuel cell of claim 1, wherein in the preparing of the frame member, clearances between the first adhesive bonds in a predetermined direction are the same size.

4. The manufacturing method of the unit cell of the fuel cell of claim 1, wherein in the preparing of the frame member, the first adhesive bonds are the same size and the same shape.

5. The manufacturing method of the unit cell of the fuel cell of claim 1, in the preparing of the frame member, the first adhesive bonds are separated from each other such that each of the first adhesive bonds is surrounded in an imaginary square having a side length of 20 mm.

6. The manufacturing method of the unit cell of the fuel cell of claim 1, wherein, in the preparing of the frame member, the first adhesive bonds are separated from each other such that each of the first adhesive bonds is surrounded in an imaginary square having a side length of one-tenth of a side length of the frame member.

7. The manufacturing method of the unit cell of the fuel cell of claim 1, wherein each first adhesive bond is modified polyolefin including at least one polyolefin including a functional group.

8. The manufacturing method of the unit cell of the fuel cell of claim 7, wherein the modified polyolefin includes: any one of or combination of silane coupling agent; epoxy resin; urethane resin; acid anhydride including maleic anhydride; carboxylic acid including acrylic acid and methacrylic acid; and alcohols including vinyl alcohol and ethylhexyl acrylate.

9. The manufacturing method of the unit cell of the fuel cell of claim 1, wherein none of the first adhesive bonds is provided on the second surface of the frame member.

* * * * *